United States Patent
Campbell et al.

(10) Patent No.: US 10,539,179 B2
(45) Date of Patent: Jan. 21, 2020

(54) SENSOR DEVICE WITH MOUNTING ELEMENT

(71) Applicant: Aktiebolaget SKF, Göteborg (SE)

(72) Inventors: Andrew Campbell, East Kilbride (GB); Allan Thomson, Lanark (GB)

(73) Assignee: AKTIEBOLAGET SKF, Gothenburg ( * ) Notice: Subject to any disclaimer, the term of this patent is extended or adjusted under 35 U.S.C. 154(b) by 2 days.

(21) Appl. No.: 16/009,298

(22) Filed: Jun. 15, 2018

(65) Prior Publication Data

US 2019/0032710 A1 Jan. 31, 2019

Related U.S. Application Data

(63) Continuation of application No. 14/960,512, filed on Dec. 7, 2015, now Pat. No. 10,041,531.

(30) Foreign Application Priority Data

Dec. 8, 2014 (GB) .................................. 1421781.4
Mar. 3, 2015 (GB) .................................. 1503530.6

(51) Int. Cl.
| | |
|---|---|
| *G01D 11/02* | (2006.01) |
| *F16C 19/52* | (2006.01) |
| *B61F 15/20* | (2006.01) |
| *G01D 11/30* | (2006.01) |
| *G01K 1/16* | (2006.01) |
| *B60B 27/00* | (2006.01) |
| *B61L 15/00* | (2006.01) |
| *G01D 11/24* | (2006.01) |
| *G01H 1/00* | (2006.01) |
| *G01H 3/00* | (2006.01) |

(Continued)

(52) U.S. Cl.
CPC ............ *F16C 19/527* (2013.01); *B60B 27/00* (2013.01); *B61F 15/20* (2013.01); *B61L 15/0081* (2013.01); *G01D 11/02* (2013.01); *G01D 11/245* (2013.01); *G01D 11/30* (2013.01); *G01K 1/16* (2013.01); *F16C 19/522* (2013.01); *F16C 19/525* (2013.01); *F16C 2326/10* (2013.01); *G01H 1/003* (2013.01); *G01H 3/00* (2013.01)

(58) Field of Classification Search
CPC ............................... B60B 27/00; G01D 11/02
See application file for complete search history.

(56) References Cited

U.S. PATENT DOCUMENTS

6,539,800 B2  4/2003  Yamashita
9,068,528 B2 *  6/2015  Sanbyakuda ........... F01L 1/047
(Continued)

FOREIGN PATENT DOCUMENTS

CN  1904332 A  1/2007
CN  101238302 A  8/2008
(Continued)

*Primary Examiner* — Jamel E Williams
(74) *Attorney, Agent, or Firm* — Garcia-Zamor Intellectual Property Law, LLC; Ruy Garcia-Zamor; Bryan Peckjian

(57) ABSTRACT

A sensor device for monitoring a component, the sensor device providing a zinc alloy mounting element comprising a bracket and a bolt. The zinc alloy of the zinc alloy mounting element increases a rigidity of the mounting element, the zinc alloy having less than 5% aluminum by weight and less than 5% copper by weight; and at least one sensor coupled to the zinc alloy mounting element for mounting to the component of interest. The at least one sensor measures at least one condition parameter of the component.

16 Claims, 10 Drawing Sheets

(56) References Cited

U.S. PATENT DOCUMENTS

| | | | | |
|---|---|---|---|---|
| 2001/0042527 A1* | 11/2001 | Uchida | ............... | F01L 1/02 |
| | | | | 123/90.15 |
| 2007/0017282 A1* | 1/2007 | Tooyama | ............ | F01L 1/053 |
| | | | | 73/114.26 |
| 2009/0214146 A1 | 8/2009 | Ehinger et al. | | |
| 2012/0192636 A1 | 8/2012 | Norimatsu et al. | | |
| 2014/0044387 A1* | 2/2014 | Kirchhoff | ............ | F16C 41/004 |
| | | | | 384/476 |
| 2014/0093199 A1* | 4/2014 | Fujiwara | ............ | B61F 15/12 |
| | | | | 384/448 |
| 2016/0161299 A1* | 6/2016 | Campbell | ............ | B61L 15/0081 |
| | | | | 73/431 |

FOREIGN PATENT DOCUMENTS

| | | | | |
|---|---|---|---|---|
| CN | 101326431 A | | 12/2008 | |
| CN | 101909540 A | | 12/2010 | |
| CN | 102066726 A | | 5/2011 | |
| CN | 102597729 A | | 7/2012 | |
| CN | 103195817 A | | 7/2013 | |
| CN | 103707901 A | | 4/2014 | |
| EP | 1921335 A1 | | 5/2008 | |
| EP | 2708865 A4 | * | 12/2014 | ......... B60B 27/0005 |
| EP | 1962073 A4 | * | 3/2016 | ......... B60B 27/0005 |
| GB | 2533090 A | * | 6/2016 | ......... B61L 15/0081 |
| JP | 2007056926 A | | 3/2007 | |
| JP | 2007056926 A | * | 3/2007 | |
| JP | 2013139204 A | | 7/2013 | |
| JP | 2014222080 A | | 11/2014 | |
| WO | WO-2009056334 A1 | * | 5/2009 | ............. F16C 33/62 |
| WO | WO-2013091888 A2 | * | 6/2013 | ............. G01P 1/026 |
| WO | 2013156068 A1 | | 10/2013 | |
| WO | 2014154257 A1 | | 10/2014 | |
| WO | WO-2014154257 A1 | * | 10/2014 | ............ F16C 19/386 |
| WO | 2015051792 A1 | | 4/2015 | |
| WO | WO-2016098643 A1 | * | 6/2016 | ............. B60B 25/04 |

* cited by examiner

SENSOR DEVICE WITH MOUNTING ELEMENT

CROSS REFERENCE TO RELATED APPLICATION

This application is a Continuation of U.S. patent application Ser. No. 14/605,512, filed on Dec. 7, 2015, which claims the benefit of Great Britain (GB) Patent Application Number 1421781.4, filed on 8 Dec. 2014, both of which are incorporated herein by reference in their entirety.

FIELD OF THE INVENTION

The invention relates to a sensor device for monitoring a mechanical component of interest, in particular a train bearing arranged in a train axle box.

BACKGROUND OF THE INVENTION

The invention relates to devices for monitoring the condition of components, in particular of rotating components of vehicles or machinery. When attempting to monitor the condition, it is often difficult to find suitable locations for the required sensor systems such that they can be applied without disassembly of mechanical systems and resultant destruction of the assemblies and components they are intended to monitor.

Connecting sensors or sensor modules directly to bearings etc. for condition monitoring is often not practical but getting the parameters of interest such as temperature, vibration and acoustic emission to a remote sensor can be difficult.

Sensor systems should be configured such that they can be quickly and easily installed for a range of condition monitoring tasks. However, increased mounting comfort often leads to an increased distance between the sensor system and the component of interest, such that the quality of the measurement is reduced due to attenuation, increased noise and environmental factors.

Parameters measured in condition monitoring are typically vibration, acoustic emission or temperature. The longer the transmission path for heat or acoustic waves, the higher the risk that information gets lost. Maximizing the transmission of signals of interest to the sensor is a key factor in maximizing the signal-to-noise ratio. In particular, material interfaces and components between the sensors and the component of interest should be minimized, as each interface can add significantly to an attenuation of signals. Unavoidable loss due to reflection or absorption at material interfaces may be reduced by matching the acoustic impedances of the materials involved. Further, the sensor system should have a compact design as the space envelope of suitable mounting sites is often small.

SUMMARY OF THE INVENTION

In view of the above considerations, the invention seeks to provide a sensor device for monitoring a component of interest which can be mounted close to the component of interest which can be employed for a large variety of components of interest made of different materials while keeping the attenuation in a transmission path of physical quantities to be measured between the component of interest and the sensor low.

The invention relates to a sensor device for monitoring a component of interest. The sensor device includes at least one sensor for measuring at least one parameter indicative of a condition of the component, signal processing device for processing the signals of the sensor, and a mounting element for mounting the sensor device to the component of interest.

It is frequently the case that it is impractical to install sensor elements directly on individual components of interest. It is also desirable to be able to mount sensor elements in a manner that facilitates flexibility of mounting location and ease of replacement. To these ends, it is known mount the sensor elements on brackets, sleds or other structural connectors, to facilitate condition monitoring. The expression "mounting element" as employed here and in the following shall cover all of these kind of structural connectors. The mounting element are also required to be constructed of a material with a high tolerance to corrosion that will lend itself to the low cost production of a wide range of form factors with sufficient mechanical strength to maintain its function under varying conditions.

It is proposed that the mounting element is made of a zinc alloy. Zinc alloys are well suited to the manufacturing technique of die casting which is considered the most appropriate production method for this application for reasons explained in more detail further below. Zinc alloy, in particular alloys containing 3.5% to 4.3% Aluminum and 0.2% to 3% Copper, have been found to provide good transmission of these signals while facilitating a single process manufacturing approach, i.e. die casting, for structural connectors which does not require additional machining. This Zinc alloy has been found to be especially beneficial as a transmission medium for acoustic emission signals giving even better results than Aluminum, even when connected to Aluminum components. This is a surprising outcome given it has a higher acoustic impedance than Aluminum and impedance matching criteria would initially indicate the opposite outcome.

The invention covers both cases where the mounting element is directly attached to the component of interest or to an intermediate component such as a housing suitable for indirect measurements of properties of the component of interest. In the latter case, the intermediate component and the point of attachment of the mounting element should be carefully chosen such that the signals of interest such as acoustic waves and temperature are transmitted via the intermediate component with an acceptable degree of loss. In a preferred embodiment of the invention, the component of interest is a bearing of a vehicle mounted in a housing, wherein the sensor device is configured to be attached to the housing.

In a preferred embodiment of the invention, the zinc alloy consists of 3.5% and 4.5% by weight aluminum, copper between 0.2% and 3% by weight, the remainder being zinc and inevitable impurities. The inventors have found that these materials lend themselves to casting to create structures with a high level of detail while having a particularly homogeneous acoustic impedance and a good matching to both components of interest made of steel and components of interest made of Aluminum. Mounting element according to the invention often need to have complex shapes and are difficult to manufacture of stainless steel, in particular austenitic steel, or other materials meeting the requirements on corrosion-resistance, which cannot be cast with a sufficiently high level of detail. Drilling- or bending operations result in localized changes to elasticity and density of the material such that the acoustic impedance will become inhomogeneous and the signal transmission of acoustic signals is difficult to control.

According to one aspect of the invention, the mounting element includes a sled having a ground plate portion configured to hold the at least one sensor and means for holding at least one spring for pressing the ground plate portion to the component of interest. Sled-type mounting element are difficult to manufacture of steel or other materials meeting the requirements on corrosion-resistance, which cannot be cast with a sufficiently high level of detail and often need bending. The materials according to the invention can be used to manufacture the mounting element with a sufficient degree of detail by casting and bending can be avoided.

The advantages of the invention are particularly important in cases where the ground plate portion includes a relief-like structure such at least one recess and/or at least one protrusion for locating the at least one sensor and/or other electronic components which would be difficult to manufacture without machining using other materials.

According to a further embodiment of the invention, the mounting element includes a screw or bolt and a bracket, wherein the bracket has a first portion including an opening for inserting the screw or bolt in an insertion direction and a second portion parallel to the insertion direction, wherein the second portion has a surface configured to mount the housing and/or the sensor. Preferably, the first portion of the bracket has an end face configured to be pressed directly against a surface of the component of interest by the clamping force generated by the bolt.

The bracket of the sensor device according to the latter aspect of the invention ensures that the sensors can be aligned for optimal detection. The second portion of the bracket arranged upright is configured for mounting the sensors and preferably has a flat surface. The coupling of acoustic emission and vibrations is of high quality because acoustic waves entering the bracket via the first portion can be securely guided to the second portion and the sensor. The angled arrangement of the two portions leads to a compact design while at the same time allowing for the insertion of a screw or bolt and fixing tools to tighten the screw or bolt even within very restricted space limits.

In preferred embodiments of the invention, the sensor is formed as a vibration sensor, an acoustic emission sensor and/or as a temperature sensor. In either case, a substance for improving the transmission of acoustic waves between the component of interest and the sensor can be used at an interface between the bracket and the component on which the bracket is mounted, wherein the substance may be a gel or a paste.

Preferably, the sensors are placed as close as possible to the base portion of the bracket in order to minimize the influence of external noise.

Further, it is proposed that the sensor device comprises at least one battery for powering the signal processing device and/or the sensor. In alternative embodiments of the invention, the sensor device can be equipped with a generator device such as a thermal generator or a power harvester.

In a preferred embodiment of the invention, the sensor device comprises a transmitter for wireless communication. This facilitates the use in retrofit applications, because the installation of wires or cables can be avoided. An antenna of the transmitter can be arranged in a protected space if the housing is made of a material permitting the transmission of electromagnetic waves emitted and/or intended to be received by the transmitter.

In a preferred embodiment of the invention, the component of interest is a bearing of a vehicle, in particular a bearing in a train axle hub. Preferably, the sensor device is configured to be attached close to a loaded zone of a non-rotating ring of a bearing. The inventors have found that there is a statistically better chance of detecting high-frequency vibrations from a bearing, if the sensor is located in the area relatively close to the loaded zone of the bearing and/or approximately in line with the load direction. In the case of a vehicle, such as a train, the load line travels vertically upwards, passing through the center of the bearing. It has been found that placing sensors within +30 degrees of the load line facilitates good signal detection of high-frequency vibrations. Further, it is proposed that the sensor is oriented with regard to the line of maximum stress in order to further improve the signal detection quality. The performance of vibration and acoustic emission sensors has been found to give best performance when the sensors are mounted on the line of maximum stress +25 degrees. These parameters apply in particular to sensor devices designed for application to monitoring train axle boxes.

Further, it is proposed that the sensor device is configured to be located in a direction of highest stiffness of the system. This direction is likely to ensure a reliable transmission of acoustic waves.

Further, it is proposed that at least the second portion of the bracket comprises a structure, such as flanges or ridges, increasing the rigidity of the second portion.

In preferred embodiments of the invention, the bracket is a cast metal part, in particular made of Zamak 5 alloy, which is an alloy as defined in the standard EN12844 with a base metal of zinc and alloying elements of aluminum, magnesium and copper. Zamak alloys are part of the zinc aluminum alloy family, wherein they are distinguished from the other ZA alloys because of their constant aluminum content of 4%. In general, it is important that the material passes vibrations, acoustic emissions and temperature, and does not block or strongly attenuate these quantities.

Further, it is proposed to provide the surface of the mounting bracket which is configured to contact the sensor in the form of a flat surface, preferably a polished surface optionally equipped with a gel for improving the acoustic coupling and/or a thermally conductive paste.

Further, it is proposed that a signal processing device is formed as a PCB which is potted or overmolded in order to protect the electronics from vibration, temperature, fire, foreign object strike corrosion, etc. The electronic parts should fulfill the standards set, e.g., in EN50155 and EN61373.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

DETAILED DESCRIPTION OF THE EMBODIMENTS

Figure 1:
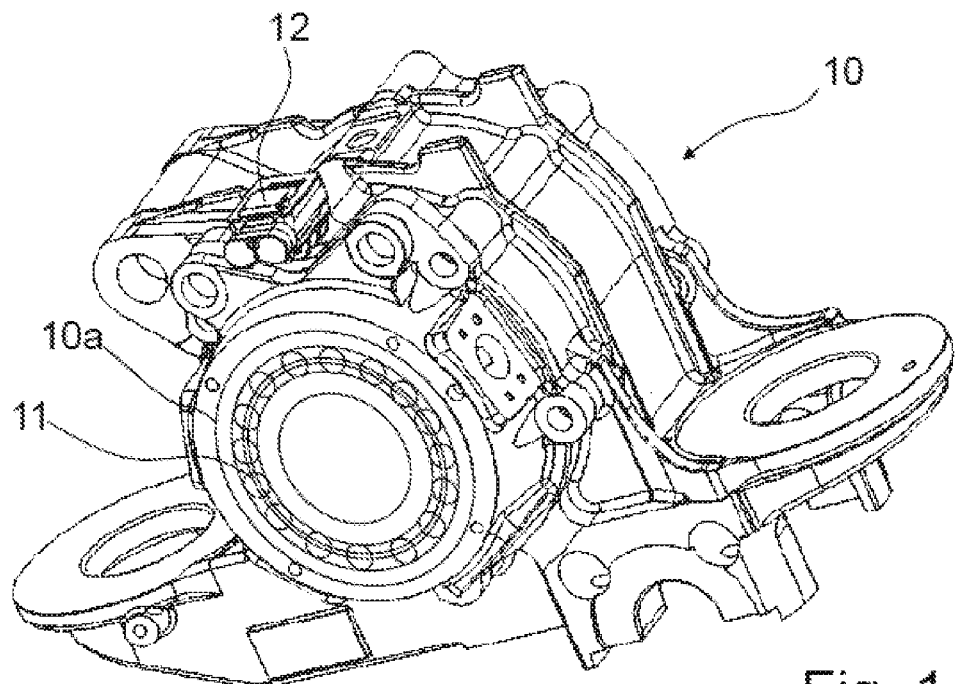
FIG. 1 illustrates an axle box equipped with a sensor device according to a first embodiment of the invention.

FIG. 1 illustrates an axle box 10 for a passenger train comprising a central bore 10a for receiving a double-row roller bearing. The bearing illustrated schematically is a component of interest 11 to be monitored using a sensor device 12 as described in further detail below. The Sensor device 12 according to the invention is attached to a flange in a top part of the axle box 10. The housing of the axle box 10 is an intermediate component arranged between the component of interest 11 and the sensor device 12 and transmits acoustic vibrations and heat emanating from the bearing.

Figure 2:
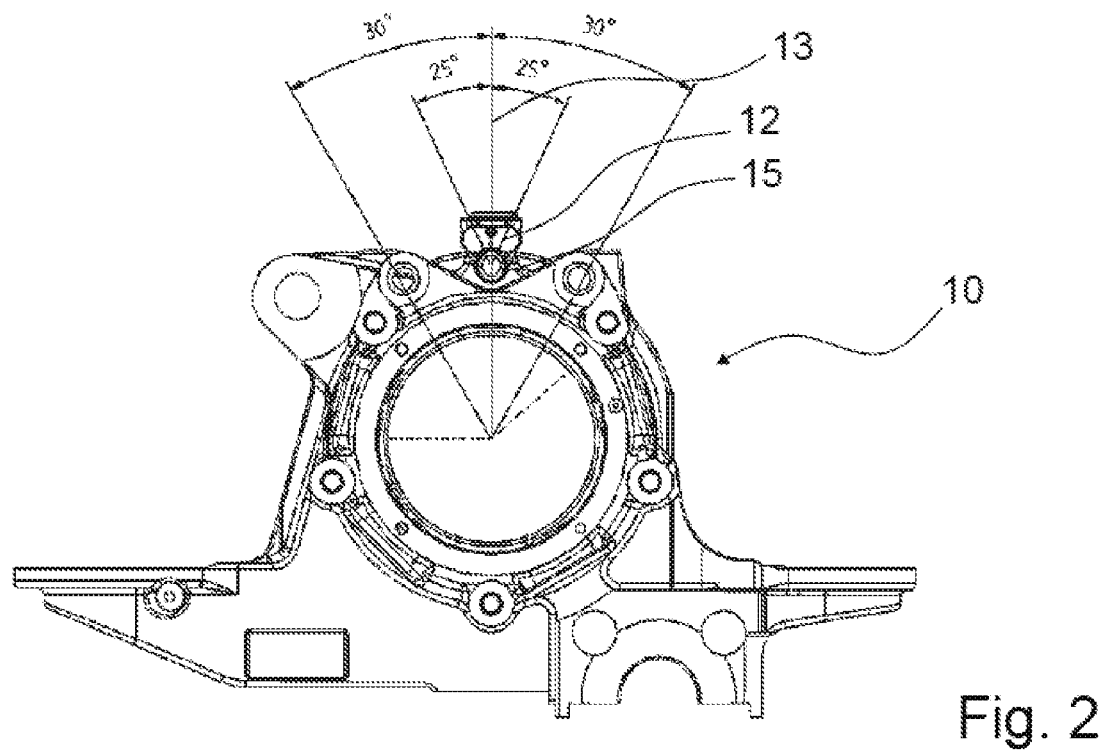
FIG. 2 is an axial view of the axle box according to FIG. 1.

As illustrated in FIG. 2, the sensor device 12 is attached directly in the line of load 13 of the axle box 10 and of the bearing mounted therein such that the sensor device 12 is located very close to a loaded zone of the bearing in a direction of maximum stiffness of the axle box 10. The sensor device includes a bolt 15 for fastening a body part of the sensor device 12 to the axle box 10. The mounting position maximizes the transmission of high frequency noise as generated e.g. by defects of the rolling elements passing by the sensor device 12.

Figure 3:
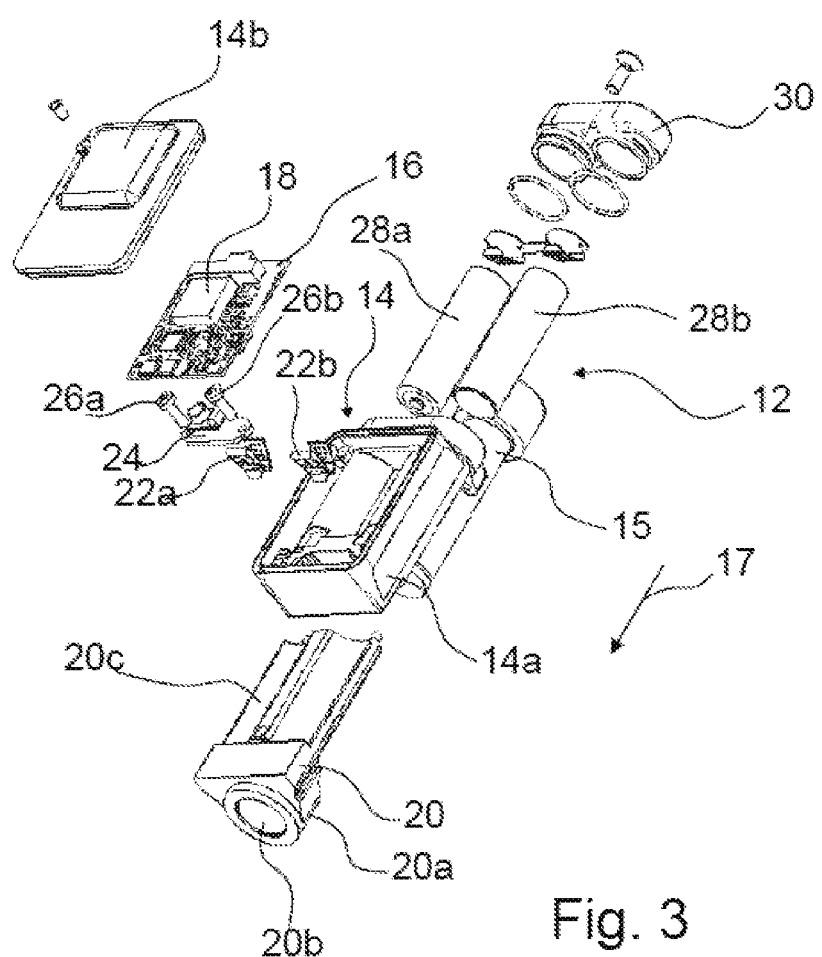
FIG. 3 is an exploded view of a sensor device according to a first embodiment of the invention.

FIG. 3 is an exploded view of the sensor device 12 according to the invention. The sensor device 12 comprises a housing 14 having a lower housing part 14a and a housing cover part 14b, both made of dielectric plastic material. The housing 14 is provided with a gasket (not shown) or with multiple gaskets in order to protect the electronics arranged therein.

The sensor device 12 includes a PCB with various electronic components as a signal processing device 16. In particular, the signal processing device includes a wireless transmitter 18, the antenna of which is arranged under a protruding portion of the housing cover member 14b such that signals sent by the transmitter and/or received by the transmitter are unaffected by the metallic parts of the axle box 10 and of the sensor device 12.

Further, the sensor device 12 includes a bracket 20 as a mounting element with a roughly angular shape, the bracket 20 having a first portion 20a with an opening 20b for receiving the bolt 15 and a second portion 20c extending perpendicular to the first portion 20a of the bracket 20. The opening 20b is configured such that the bolt 15 can be fitted into the opening 20b in an insertion direction 17. The second portion 20c has a surface extending parallel to the insertion direction 17 and the housing is mounted on the surface using screws.

Sensors 22a, 22b formed as temperature and acoustic emission sensors are attached to the signal processing device 16 via a flexible circuit board, and are directly attached to or embedded into a solid base part of the bracket 20 connecting the portions 20a, 20c. The sensors 22a, 22b are fixed on the bracket by means of a mounting plate and screws 26a, 26b. Electronic devices such as capacitors for filtering or damping the sensor signals are mounted on the mounting plate as a part of a sensor unit 24 including the sensors 22a, 22b.

Further, the sensor device 12 includes batteries 28a, 28b and a cover member 30 of a battery compartment as well as suitable electrodes and gasket rings for sealing the battery compartment.

The printed circuit board forming the signal processing device 16 is potted on both sides.

As illustrated in FIG. 3, the second portion 20c of the bracket 20 is provided with stabilizing ridges following the shape of the batteries 28a, 28b, which increase the rigidity of the bracket. The bracket is a solid cast metal part made of Zamak 5 alloy.

The inventors have found that the total acoustic transmission between the component of interest 11 and the sensors 22a, 22b is very good even if the housing of the axle box 10 to which the sensor device 12 is attached is made of a different material. The acoustic signal transmission at the interface Aluminum-Zinc alloy was found to be 96% and the acoustic signal transmission at the interface Steel-Zinc alloy was found to be 91%. Though it appears at first sight that a mounting member 20 made of aluminum would be a perfect match for a component of interest 11 or intermediate component 10 made of Aluminum, the inventors found surprisingly that the attenuation within the Aluminum block and the reflections at the interface to the piezoelectric crystal of the acoustic emission sensor lead to an overall loss exceeding the total loss when using a mounting member 20 made of Zinc alloy.

Temperature of the components being monitored, either absolute or relative to other components, is an important factor in condition monitoring. While stainless steel is listed as having thermal conductivity in the region of 18 Wm-1K-1, zinc alloy has a thermal conductivity in the region of 110 Wm-1K-1, which is more than adequate for the intended purpose.

Although the modulus of elasticity for Zinc alloy (~96 GPa) is generally lower than steel (210 Gpa) its density (~6800 kg/m3) is also lower than steel (7850 kg/m3) thus for many designs its first structural natural frequency is generally not much lower than a steel part of same dimensions, but by being lighter a Zinc alloy structure of the same mass is likely to have the same or a higher first natural frequency as steel as more volume of material to increase rigidity can be utilized.

Hence the same "useful" frequency response for vibration measurements can be obtained.

The sensors 22a, 22b can be attached to a flat portion of the surface of the bracket 20 and/or fitted into a recess provided in the material of the bracket 20. The recess and the flat surfaces can be achieved by die casting without machining when the Zinc alloy according to the invention is used.

The location at which the sensors 22a, 22b are attached to the bracket 20 should be as close as possible to the lower surface of the first part 20a of the bracket facing the axle box 10 and the bearing as the component to be monitored. In the embodiment illustrated in FIGS. 3 to 6, the sensors 22a, 22b, which are hidden in FIGS. 4 to 6, are arranged axially between the head of the bolt 15 and the axle box 10.

Figure 4:
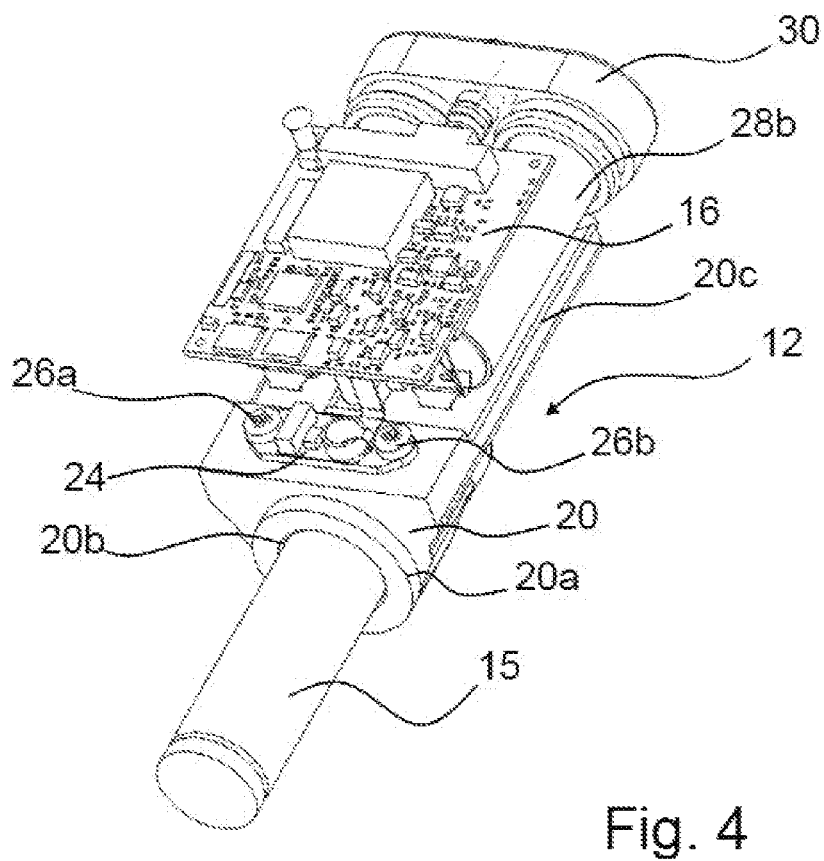
FIG. 4 is a further exploded view of the sensor device according to the first embodiment of the invention.

FIG. 4 illustrates the assembly with the housing parts 14a, 14b removed.

Figure 5:
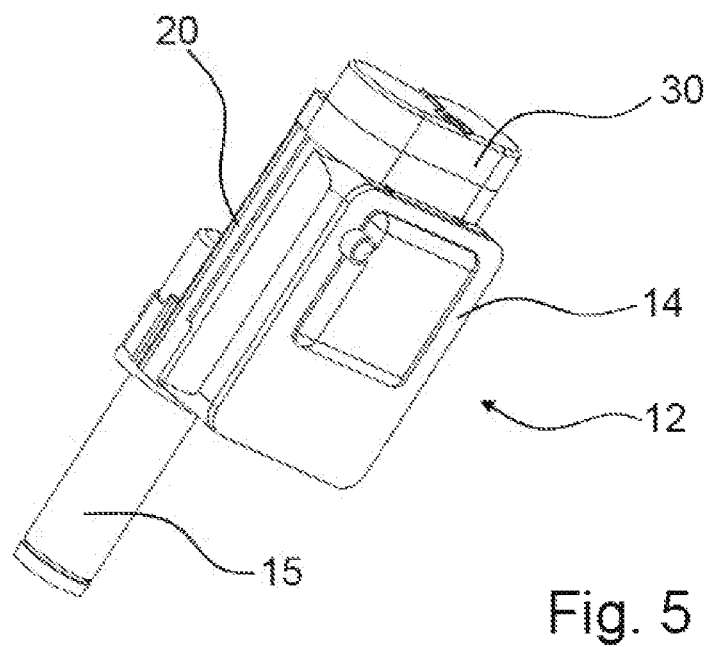
FIG. 5 is a first perspective view of the sensor device according to the first embodiment of the invention in an assembled configuration.
Figure 6:
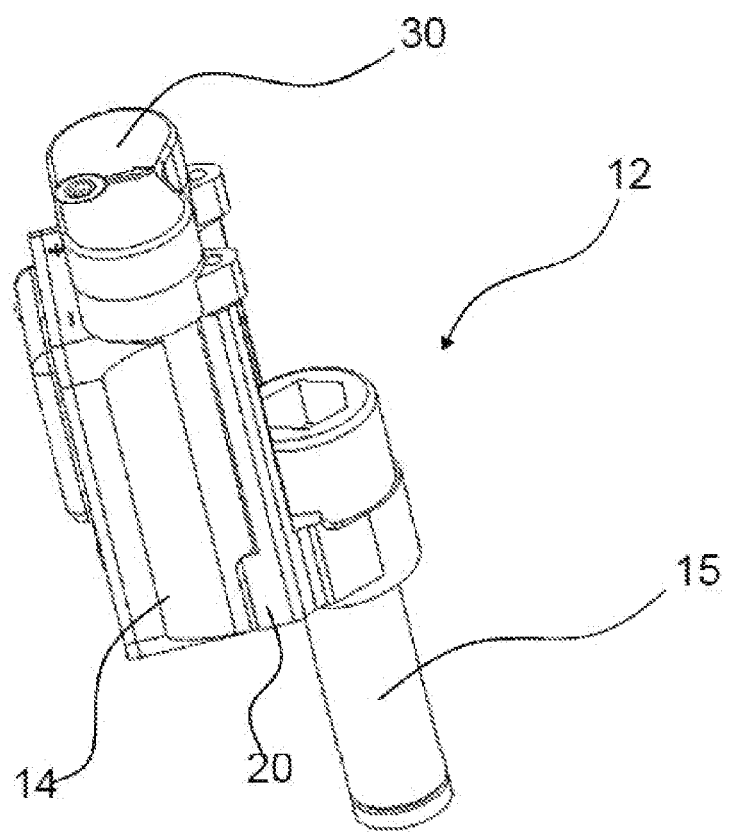
FIG. 6 is a second perspective view of the sensor device according to the first embodiment of the invention.

FIGS. 5 and 6 show the sensor device 12 in different perspective views.

Further embodiments of the invention are illustrated in FIGS. 7 to 11. The following description of the further embodiments is limited to differences to the embodiment illustrated in FIGS. 1 to 6 in order to avoid repetitions. For features which are unchanged the reader is referred to the above description of the embodiment of FIGS. 1 to 6. Similar features are provided with the same reference numbers in order to highlight the similarities.

Figure 7:
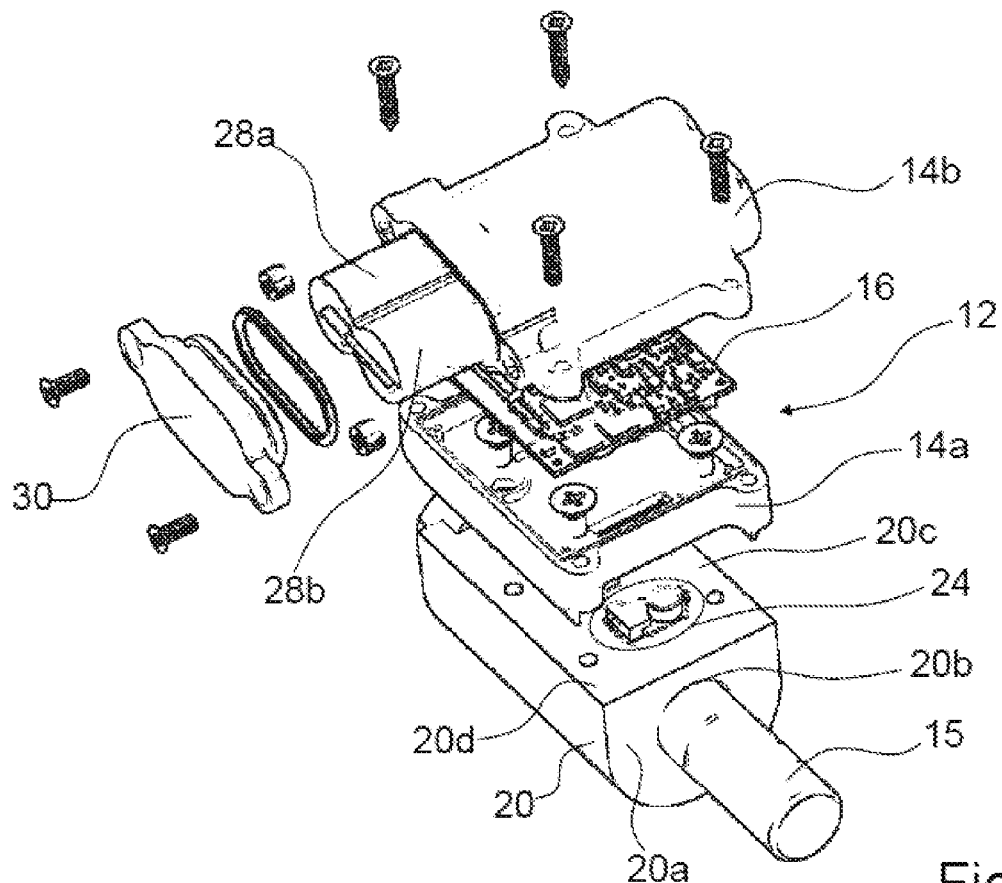
FIG. 7 is an exploded view of the sensor device according to a second embodiment of the invention.
Figure 8:
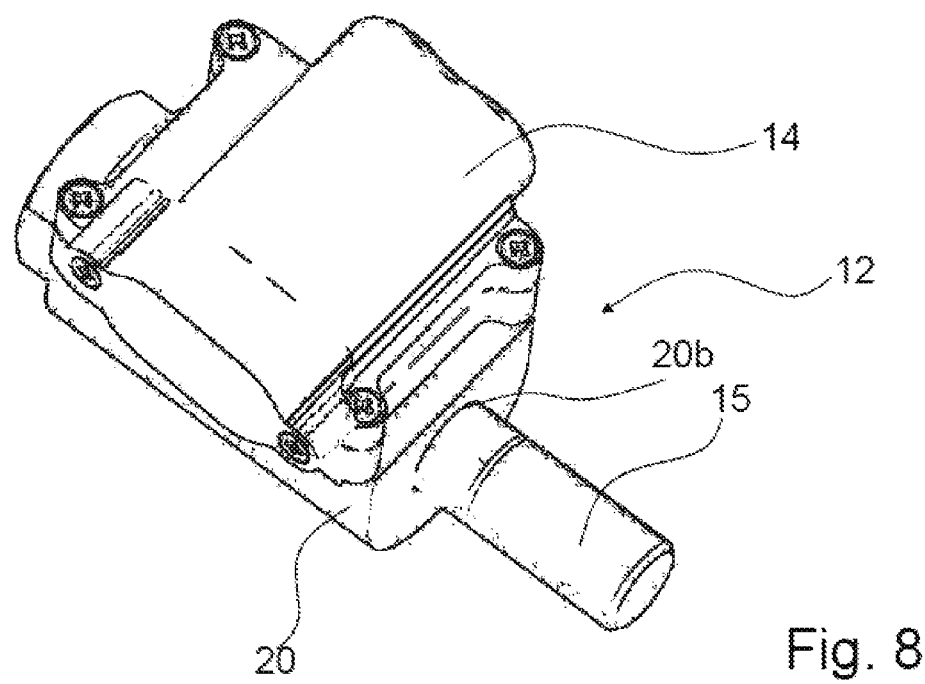
FIG. 8 is a sensor device according to the second embodiment of the invention in an assembled configuration.

In the embodiment of FIGS. 7-8, the bracket 20 is formed as a sleeve-like body with an opening 20b formed as an axial bore and a flat side face 20d with smaller bores for mounting the housing 14 using screw. A sensor unit 24 is embedded in a recess in the side face 20d and the sensing surfaces of the sensors (not visible) are contact with an inner surface of the recess, wherein the inner surface extends in a direction perpendicular to the axial direction of a bolt 15 for fastening the sensor device 12.

The orientation of the battery compartment or power pack of the sensor device 12 in the embodiment of FIG. 7 is rotated by 90° as compared to the embodiment of FIGS. 1 and 2. Further, the battery compartment is arranged on top of the signal processing device 16. The more massive bracket 20 in the embodiment of FIG. 7 ensures a transmission of vibrations and heat transfer with low loss. The bolt 15, which is a standard M16 bolt, has to be about 40 mm longer than in the embodiment of FIGS. 1-6.

Figure 9:
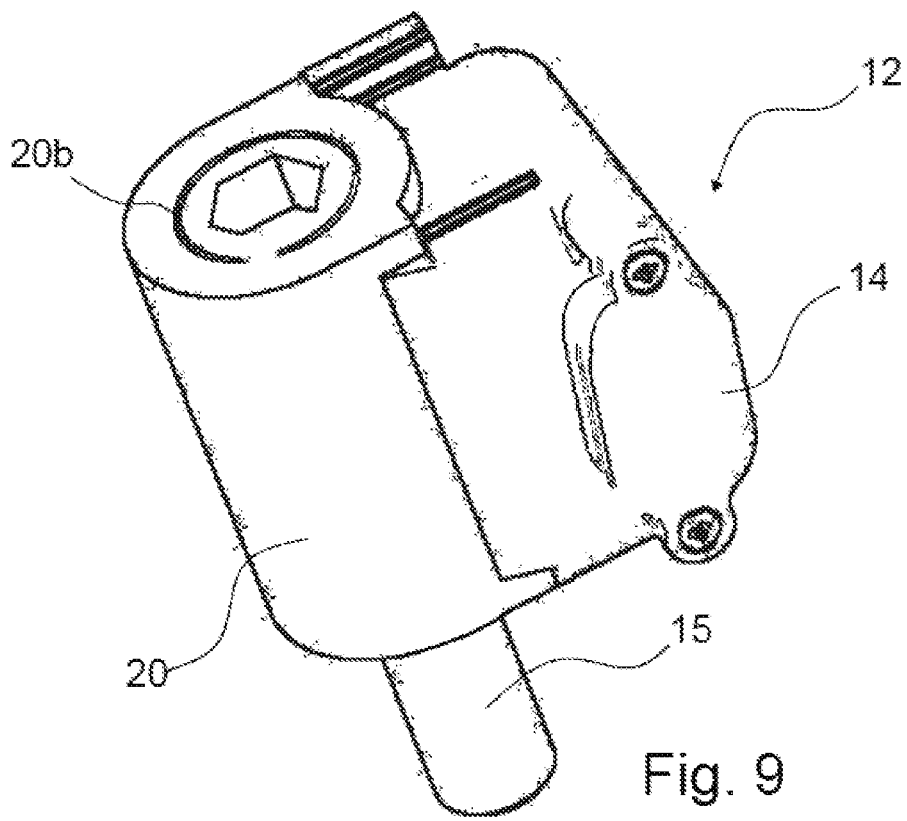
FIG. 9 is a perspective view of a sensor device according to a third embodiment of the invention.

In the embodiment of FIG. 9, the bracket 20 is formed as a sleeve-like body with an opening 20b formed as an axial bore, wherein an end of the bore remote from the side of the component to be monitored has an increased diameter in order to countersink the head of the bolt 15.

Figure 10:
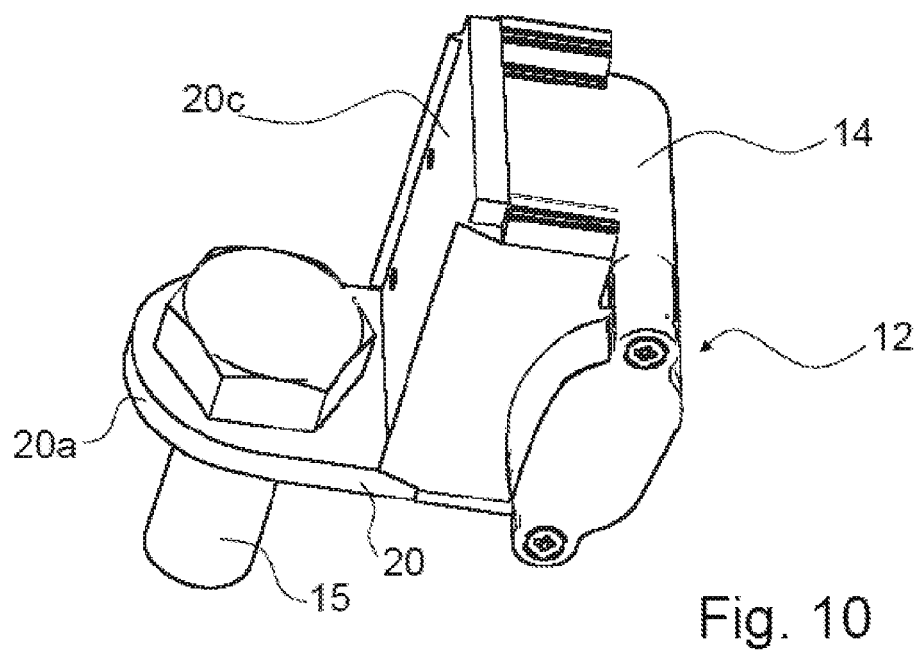
FIG. 10 is a perspective view of a sensor device according to a fourth embodiment of the invention.
Figure 11:
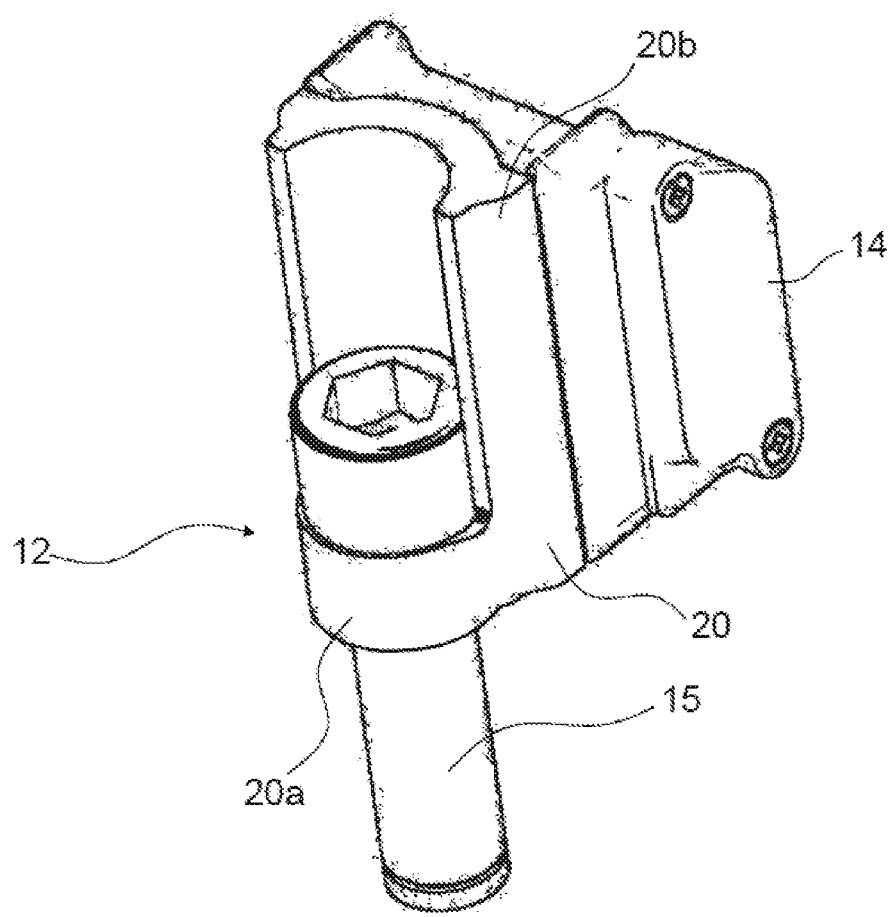
FIG. 11 is a perspective view of a sensor device according to a fifth embodiment of the invention.
Figure 12:
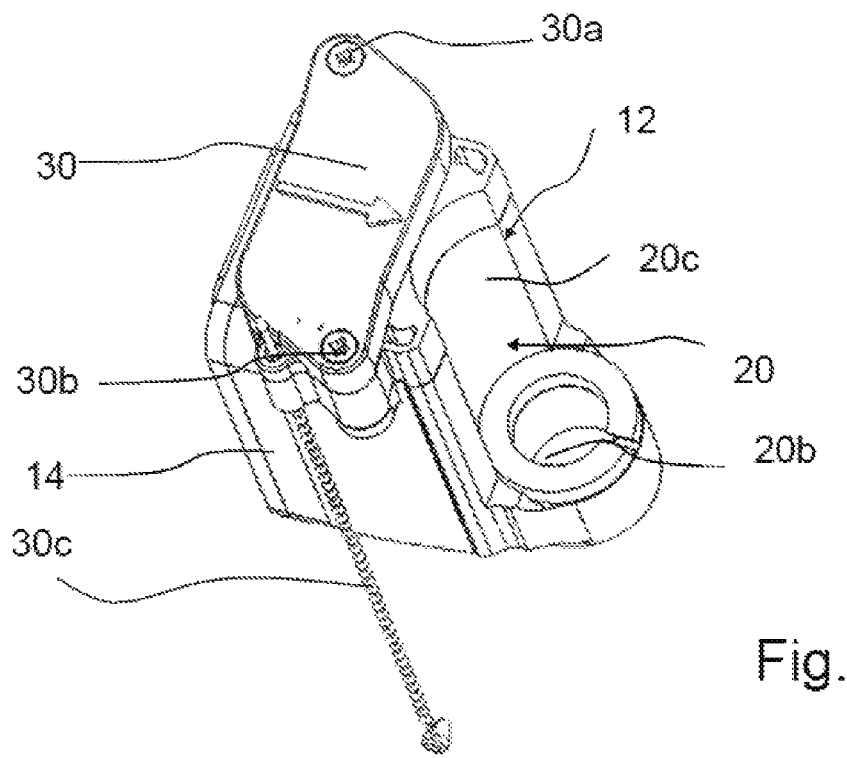
FIG. 12 is a perspective view of a sensor device according to a sixth embodiment of the invention.
Figure 13:
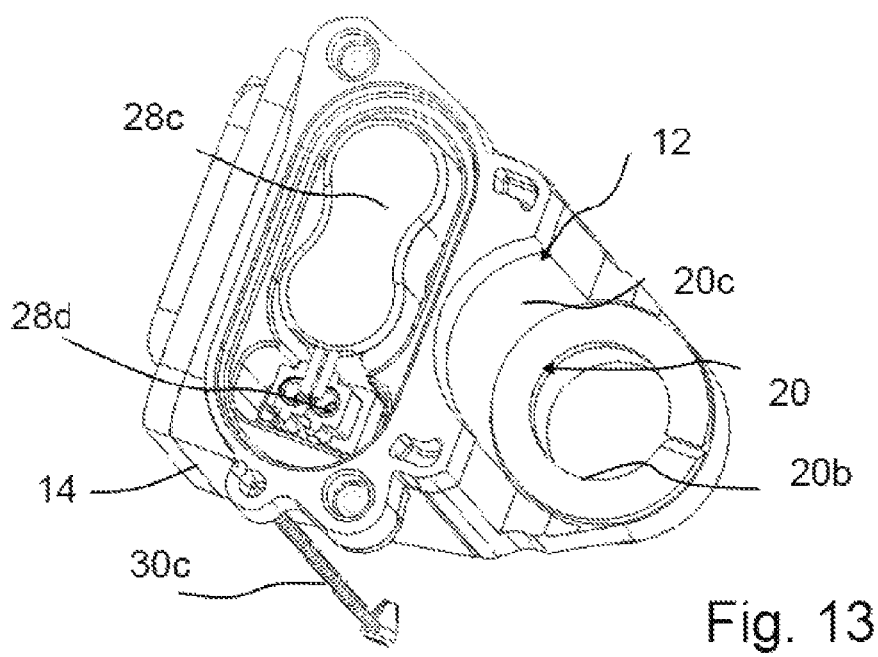
FIG. 13 is a perspective view of the sensor device according to the sixth embodiment of the invention with a battery cover removed.
Figure 14:
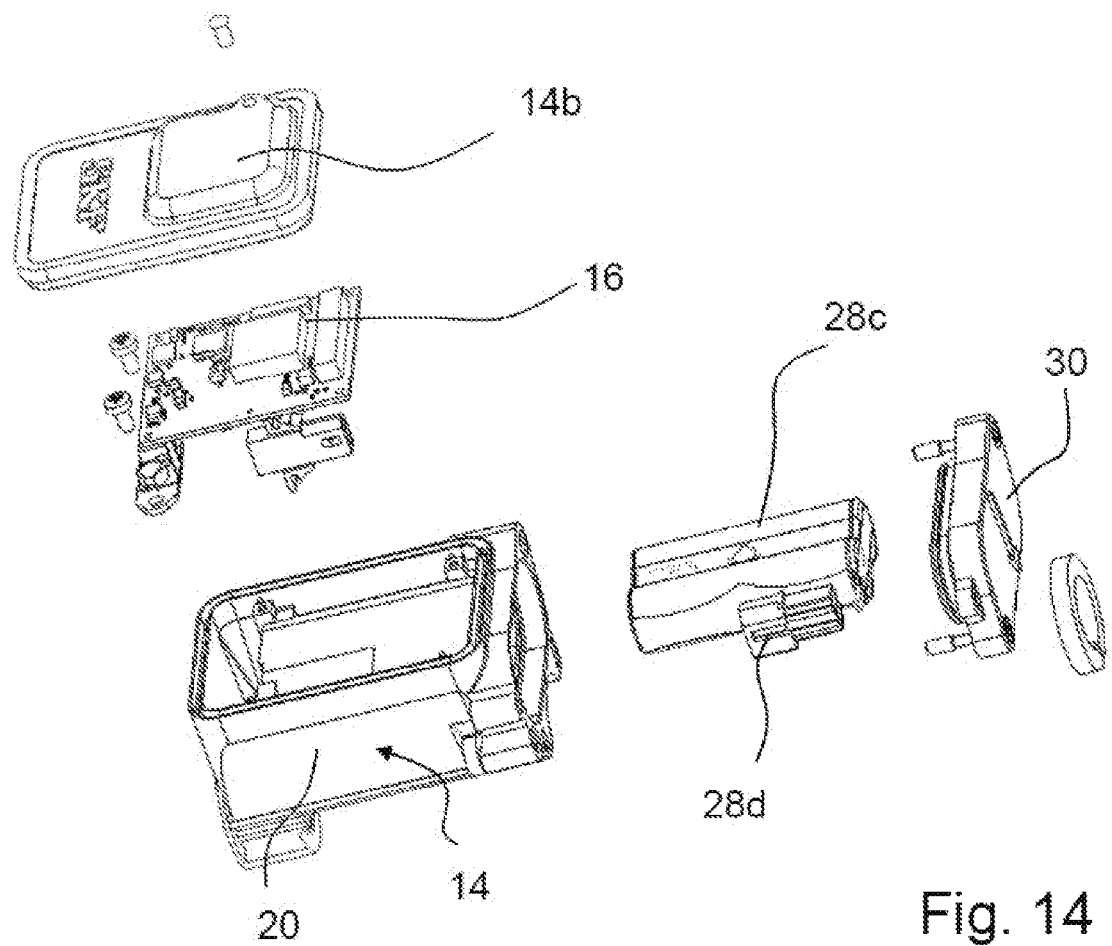
FIG. 14 is an explosion view of the sensor device according to the sixth embodiment of the invention.

The embodiment of FIG. 10 features a generally L-shaped bracket with an angular shape for fixing the sensor device 12 to the axlebox.

In the embodiment of FIG. 10, the bracket 20 of the sensor unit 12 includes an inner surface with a roughly semicircular profile encompassing a screw head of the bolt 15. The lateral edges of the semicircular profile are formed as ridges increasing the rigidity of the bracket 20.

FIGS. 11 to 14 are views of a sensor device according to a sixth embodiment of the invention. Instead of using batteries with clips a battery pack 28c with a connector 28d is used. The battery pack 28c is arranged in a space provided between a PCB as the signal processing device 16 and a body part as the second portion 20c of the bracket 20. The battery cover 30 is fixed by two screws 30a, 30b and kept assembled to a housing 14 of the device by a cable tie 30c.

Further embodiments of the invention include spacers to be arranged between the bracket 20 and the axlebox 10.

Figure 15:
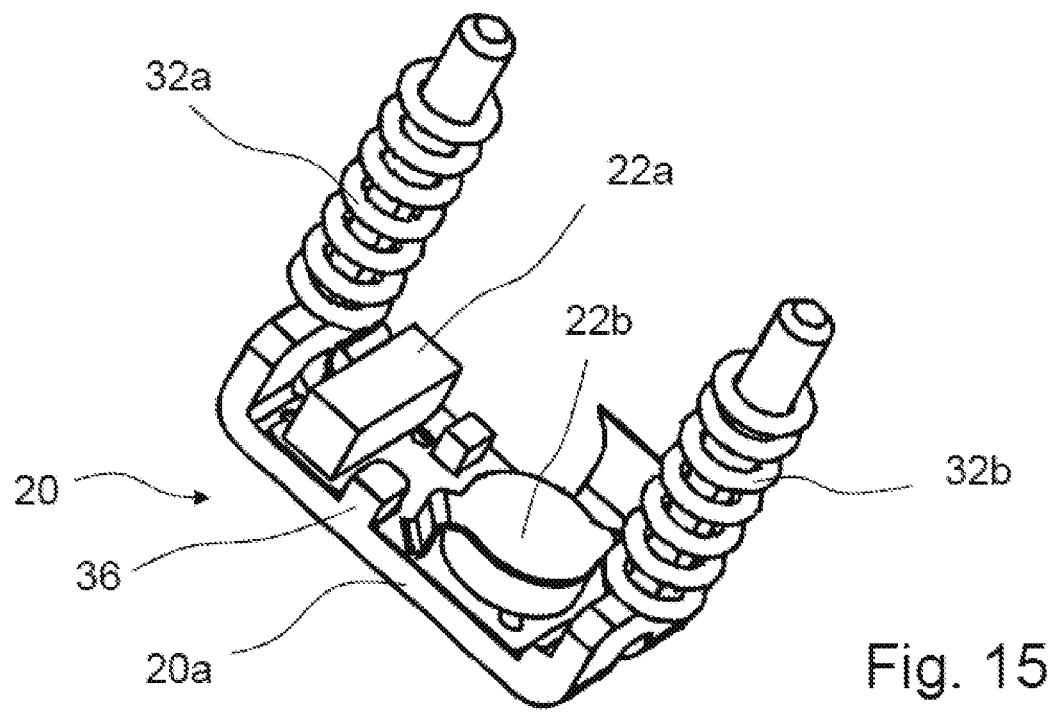
FIG. 15 is a sensor device according to a seventh embodiment of the invention.

FIG. 15 is a sensor device according to a seventh embodiment of the invention. The mounting element 20 is formed as a sled having a ground plate portion 20a configured to hold the sensors 22a, 22b and rods protruding from the ground plate portion as means for holding two coil springs 32a, 32b for pressing the ground plate portion to the component of interest.

The embodiment with a spring loaded sled with piezoelectric sensor elements and temperature sensor mounted allows sensor modules to be affixed and detached from a monitoring site with relative ease. When using this sled approach, it is essential that good signal energy transmission to the piezoelectric crystals is achieved. An important aspect to this is the surface of the sled being in contact with the component being monitored is required to be flat and smooth. When stainless steel is used and formed using a bending process, the contact surface becomes arched which results in poor AE transmission across the interface.

Figure 16:
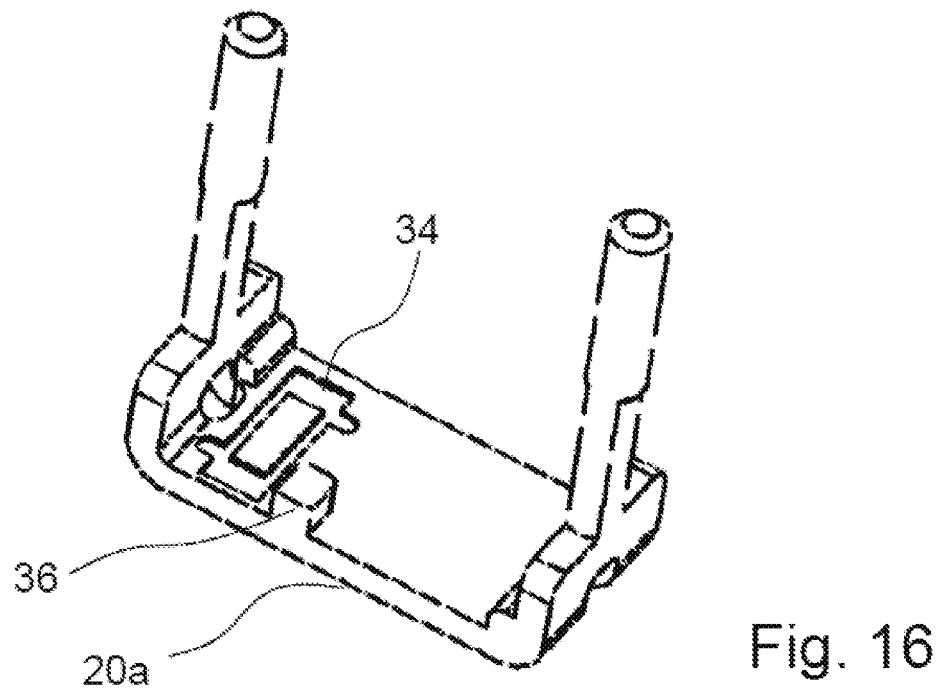
FIG. 16 is a mounting element of the sensor device according to the seventh embodiment of the invention.

FIG. 16 is a mounting element 20 of the sensor device according to the seventh embodiment of the invention. As shown in FIG. 16, the ground plate portion 20a includes a relief-like structure with a recess 34 and a protrusion 36 for locating the sensors 22a, 22b and other electronic components.

The mounting elements 20 of all embodiments of the invention are die-cast metal parts without subsequent machining such that inhomogeneous elasticity can be avoided. While a vast array of manufacturing techniques could be employed, it has been identified that the most suitable in this instance is die casting. The tolerance levels that can be achieved with die casting leads to reduced machining, or in the cases identified for this application, no machining. A high level of detail can be achieved and die casting of flat surfaces with Zinc alloy provides the smoothness and tolerances required of an interface for good acoustic emission energy transfer. These factors are normally only achieved by machining e.g. similar and other manufacturing processes for steel leave rough or warped surfaces. Hence, die casting of Zinc alloy achieves the desired results at a fraction of the cost.

What is claimed:

1. A sensor device for monitoring a component of a vehicle, the component being a bearing mounted in a housing, the sensor device comprising:
   a zinc alloy mounting element comprising a bracket, a flat surface, and a bolt, wherein the zinc alloy of the zinc alloy mounting element increases a rigidity of the mounting element, the zinc alloy comprising less than 5% aluminum by weight and less than 5% copper by weight, and wherein the flat surface contacts the housing when the mounting element is mounted to the housing;
   at least one sensor coupled to the zinc alloy mounting element for mounting to the component of interest, wherein the at least one sensor measures at least one condition parameter of the component, and wherein the at least one sensor device is configured to attach via the zinc alloy mounting element to the housing close to a loaded zone of a non-rotating ring of the bearing.

2. The sensor device according to claim 1, wherein the zinc alloy comprises:
   between 3.5% and 4.5% aluminum by weight, between 0.2% and 3% copper by weight, with a remainder being zinc.

3. The sensor device according to claim 1, wherein the zinc alloy mounting element comprises:
   a die-cast metal part without subsequent machining to avoid inhomogeneous elasticity and increase a material tolerance level.

4. The sensor device according to claim 1, wherein the zinc alloy mounting element comprises:
   an opening in which the bolt in placed in an insertion direction.

5. The sensor device according to claim 4, wherein the flat surface comprises:

a die casted flat surface achieving smoothness and tolerance required for acoustic emission energy transfer between the housing and the sensor device.

6. The sensor device according to claim 1, wherein the bracket comprises:
a Zamak 5 alloy.

7. The sensor device according to claim 1, wherein the zinc alloy mounting element comprises a sled.

8. The sensor device according to claim 7, wherein a sled comprises:
a ground plate portion holding the at least one sensor;
at least one spring pressing the ground plate portion to the component of interest; and
a holding element for embracing the at least one spring.

9. The sensor device according to claim 8, wherein the ground plate portion comprises:
a locating element comprising at least one recess or at least one protrusion.

10. The sensor device according to claim 1, wherein the sensor device comprises:
a substance provided at an interface between the at least one sensor and the bracket, wherein the substance improves a transmission of the at least one condition parameter of the component.

11. The sensor device according to claim 1, wherein the sensor device comprises:
a signal processing device for processing signals from the at least one sensor.

12. The sensor device according to claim 1, wherein the at least one sensor comprises a vibration sensor, an acoustic emission sensor, or a temperature sensor.

13. A system comprising:
the sensor device according to claim 1.

14. The system according to claim 13, wherein the at least one sensor device is attached within +/−30 degrees of a load line with regard to a rotation axis of the bearing.

15. The system according to claim 14, wherein the load line comprises a straight line passing the rotation axis of the bearing in a direction where an operational load on the bearing is maximum.

16. The system according to claim 13, wherein the component is an axle-box of a train.

* * * * *